United States Patent [19]

Makino et al.

[11] Patent Number: 5,763,026
[45] Date of Patent: Jun. 9, 1998

[54] ANCHOR - FIXING CAPSULES

[75] Inventors: Keiichi Makino; Kouji Shirasaki; Tooru Utsunomiya, all of Fukui, Japan

[73] Assignee: Maeda Kousen Kabushiki Kaisha, Fukui, Japan

[21] Appl. No.: 716,603

[22] Filed: Sep. 19, 1996

[30] Foreign Application Priority Data

Sep. 25, 1995 [JP] Japan .................. 7-268966

[51] Int. Cl.$^6$ .................. E21D 20/00; E04B 1/38
[52] U.S. Cl. .................. 428/34.4; 428/34.5; 428/34.7; 428/35.7; 428/36.9; 206/219; 52/698; 405/259.6
[58] Field of Search .................. 52/698; 206/219, 206/220; 411/82, 258; 405/259.6; 428/34.4, 34.7, 34.1, 34.5, 35.7, 36.9, 36.92

[56] References Cited

U.S. PATENT DOCUMENTS 4,894,269  1/1990  Kimura .................. 428/43

FOREIGN PATENT DOCUMENTS 5-214899  8/1993  Japan .
5-171695  11/1993  Japan .
977808  11/1982  U.S.S.R. .................. 408/259.6

*Primary Examiner*—Rena Dye
*Attorney, Agent, or Firm*—Burgess, Ryan & Wayne

[57] ABSTRACT

An anchor-fixing capsule comprising a crushable capsule, and a hardenable resin component and a powdery or granular hardener component with which the crushable capsule is filled, said hardenable resin component being separated from said hardener component by a separation layer, wherein said hardenable resin component and said hardener component are each alternately disposed in two or more layers, which provides uniform good mixing of the hardenable resin component and the hardener component in driving an anchor, resulting in good adhesive strength of the anchor.

7 Claims, 2 Drawing Sheets

ANCHOR - FIXING CAPSULES

BACKGROUND OF THE INVENTION

The present invention relates to anchor-fixing capsules used in fixing anchors in post installation, and more particularly to anchor-fixing capsules suitable for simple hammering in driving methods.

In the present invention, hardenable resin components and hardener components are well mixed merely by hammering anchors (anchor bolts or deformed bars) to give good adhesion in to drilled holes.

When anchors are fixed to concrete foundations, walls and pillars, the driving methods have previously been employed in which anchor-fixing capsules are inserted into drilled holes, and then, anchor bolts or deformed bars for anchors are hammered into the holes without rotation.

The anchor-fixing capsules used in the anchor-driving methods comprise easily crushable containers such as glass containers, and hardenable resin components and hardeners separately contained therein. The capsules are inserted into the drilled holes, and the anchors are hammered into the holes, thereby crushing the containers and mixing the hardenable resin components and hardener components to solidify the resins. Thus, the anchors are fixed to the drilled holes. For separation of the hardenable resin components from the hardeners, various systems are proposed.

For example, capsules with the hardenable resin components disposed in glass containers and the hardeners disposed on the outsides thereof are proposed. Examples of such capsules include a capsule in which the hardenable resin component is contained in a glass container, and the hardener is applied to an outer surface thereof (Japanese Patent Unexamined Publication No. 61-122400), a capsule in which an opening of a container containing the hardenable resin component is sealed with a cap formed of an inorganic material containing the hardener (Japanese Patent Unexamined Publication No. 63-142199), and a capsule in which the hardenable resin component is contained in a cylindrical glass container having a drawn depression on an outer surface thereof, the container is sealed, and the hardener is disposed on the outer surface (Japanese Utility Model Unexamined Publication No. 3-103233 and Japanese Patent Unexamined Publication No. 5-171695).

Further, capsules are also proposed in which the insides of glass containers are each divided into two parts, and the hardenable resin components and the hardeners are separately contained therein. Examples of such capsules include a capsule in which an inner container of a double glass container is filled with the hardenable resin component, and the space between the inner container and an outer container is filled with the hardener so as to envelope the inner container (PCT International Publication No. WO89/08202), and a capsule in which the hardenable resin component and the hardener are separately disposed in two layers separated by a separation layer in a glass container (Japanese Patent Unexamined Publication Nos. 61-225499 and 5-214899). Japanese Patent Unexamined Publication No. 61-225499 discloses a method for producing the capsule comprising filling the space between both of the layers with the hardenable resin component and the hardener, followed by standing, and forming the separation layer with a reaction product thereof.

As to the capsules in which the hardeners are disposed outside the glass containers, the hardeners possibly fall off or peel off, and there is also the danger that the hardeners such as peroxides directly come into contact with the skin of workers. Further, the hardeners are solidified with adhesives, etc., so that the hardenable resin components and the hardeners are liable to be insufficiently mixed in driving the anchors, resulting in a variation in adhesive strength. Furthermore, the adoption of deformed glass containers results in increased cost of the containers, directly independent of the adhesive strength of the anchors. On the other hand, with respect to the capsules the insides of which are filled with the hardenable resin components and the hardeners, the problems of falling off or peeling off of the hardeners or contact of the hardeners with the workers are solved. However, the hardenable resin components and the hardeners are separately disposed in two layers separated up and down by the separation layers, so that sufficient mixing of the hardenable resin components and the hardener components is not necessarily obtained in driving the anchors. Accordingly, the problem of a variation in adhesive strength caused by poor mixing is not solved yet.

SUMMARY OF THE INVENTION

It is therefore an object of the present invention to provide an anchor-fixing capsule giving uniform mixing of a hardenable resin component and a hardener component in hammering an anchor, resulting in good adhesive strength of the anchor.

According to the present invention, there is provided an anchor-fixing capsule comprising a crushable capsule, and a hardenable resin component and a powdery or granular hardener component with which the crushable capsule is filled, said hardenable resin component being separated from said hardener component by a separation layer, wherein said hardenable resin component and said hardener component are each alternately disposed in two or more layers. This anchor-fixing capsule may further comprise an aggregate component layer as an uppermost layer in the capsule.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings of which.

DESCRIPTION OF THE PREFERRED EMBODIMENTS

Figure 1:
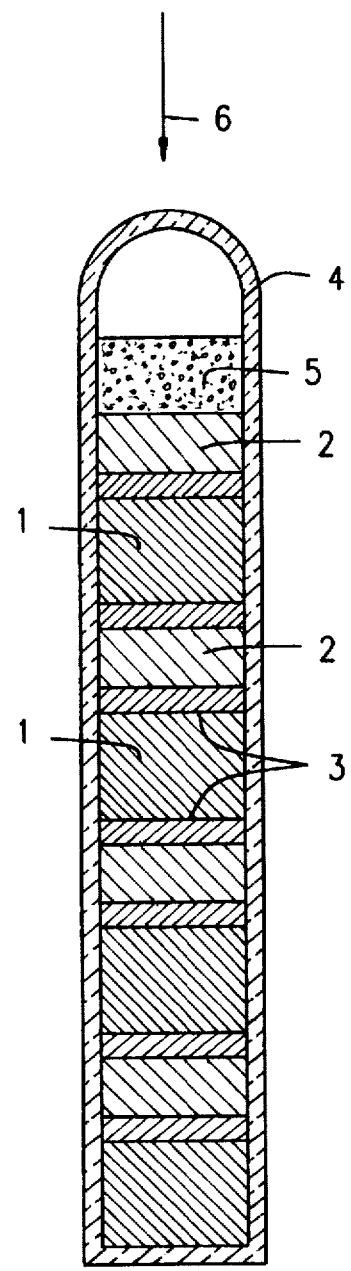
FIG. 1 is a cross sectional view showing an anchor-fixing capsule embodying the present invention.

According to the anchor-fixing capsule of the present invention, the hardenable resin component having a viscosity within a specified range and the powdery or granular hardener component are stacked on each other in the layer form in the capsule, thereby easily forming the separation layers by the reaction of the hardenable resin and the hardener in interfaces therebetween. Accordingly, the hardenable resin component and the hardener component can be alternately disposed in multiple layers.

In the present invention, the crushable capsule is a cylindrical container which can be easily crushed by driving of an anchor. Examples thereof include containers formed of glass, pottery, ceramics, plastics, etc. Of these, the cylindrical glass containers are most preferably used which are easily crushable, and crushed materials of which also function as aggregates of adhesive components.

There is no particular limitation on the size of the crushable containers. However, from the size of anchors used in post installation, the containers generally have an outer diameter of about 8 mm to about 30 mm, a length of about 40 mm to about 400 mm, and an inner volume of about 2 ml to about 280 ml. The inner volume as used herein means a volume including a glass tube (excluding an air layer) and filling a hole by crushing.

In the present invention, the hardenable resin components are essentially composed of liquid hardenable resins, and may contain aggregate components and other additives if desired. There is no particular limitation on the hardenable resins, as long as they are hardened by the reaction with the hardeners. However, unsaturated polyester resins, epoxyacrylate resins, epoxy resins, etc. are preferably used.

Further, as these hardenable resins, resins having a gelation time of 0.5 minute to 10 minutes at 25° C., preferably 1 minute to 5 minutes, are preferably used. If the gelation time of the hardenable resins is too long, the amount of the liquid hardenable resins penetrated into the hardener layers is excessively increased. On the other hand, if it is too short, there is the possibility of solidification in the course of installation.

The aggregates added if desired include inorganic and organic fillers such as siliceous sand, quartz, white carbon, carbon black, talc, silica, calcium carbonate, limestone, gypsum, magnesia clinker, glass beads, resin particles and metal particles. They may be surface treated with silane or titanate coupling agents, or may be used in combination with these coupling agents.

The viscosity of the hardenable resin components is preferably 300 to 50,000 centipoises, more preferably 1,000 to 20,000 centipoises, and most preferably 2,000 to 10,000 centipoises. The viscosity of the hardenable resin components can be adjusted by the polymerization degree of the hardenable resins, and may be adjusted by addition of fillers. When the viscosity of the hardenable resin components is too high, not only mixing of the resin components and the hardener components in driving the anchors becomes insufficient, but also the driving resistance of the anchors is increased. On the other hand, when the viscosity is too low, the amount of the hardenable resin components penetrated into the hardener component layers disposed alternately with the hardenable resin component layers in the capsules is increased, and the separation layer thickness formed by solidification due to the reaction with the hardeners are widened, resulting in useless consumption of both the hardenable resins and the hardeners.

In the present invention, the hardener components are powdery or granular. They are mainly composed of the hardeners and diluents, and may contain aggregates if necessary.

The hardener varies according to the kind of hardenable resin used. For example, when the hardenable resins are unsaturated polyester resins or epoxyacrylate resins, peroxides such as benzoyl peroxide are used as the hardeners. Further, when the hardenable resins are epoxy resins, various amines, acid anhydrides, boron trifluoride, etc. are used. They are diluted with diluents, and aggregate components are added thereto if necessary. Then, the resulting compositions are solidified to use them in the powdery or granular form. When the hardenable resins are unsaturated polyester resins or epoxyacrylate resins, a mixture of benzoyl peroxide and calcium sulfate or calcium carbonate, benzoyl peroxide diluted with dicyclohexyl phthalate, etc. are preferably used.

When the hardeners are peroxides such as benzoyl peroxide, it is dangerous to use them independently. They are therefore diluted with diluents when used.

The diluents used herein include powdery diluents such as calcium carbonate and gypsum, and granular diluents such as dicyclohexyl phthalate.

These diluents are used in such an amount that the resulting hardener components become powdery or granular.

Further, powdery or granular aggregate components are added to the hardener components if necessary. As the aggregate components, aggregate components similar to those illustrated as the aggregate components added to the above-mentioned hardenable resin components can be used. The use of the aggregate components having a mean particle size of 1 mm or less, more preferably 0.5 mm or less, prevents the hardenable resins from penetrating into the hardener component layers, and controls the thickness of the solidified separation layers formed by the reaction of the hardenable resins with the hardeners.

In the present invention, the separation layers are formed as resin layers solidified by the reaction of the hardenable resin components with the hardener components in the interfaces therebetween by filling the crushable capsules with the hardenable resin components and the hardener components alternately in turn. The thickness of the separation layers can be controlled by adjusting the gelation time of the hardenable resins, the viscosity of the hardenable resin components, and the kinds and the amount of the diluents and the mean particle size of the aggregate components contained in the hardener components, as described above.

In the present invention, there is no particular limitation on the order of formation of the hardenable resin component layers and the hardener component layers in the crushable capsule. However, both of the layers are each formed in two or more layers. If each layer is formed in one layer, mixing of the hardenable resin components and the hardener components becomes insufficient in driving the anchors by hammering, resulting in failure to obtain the desired adhesive strength of the anchors in some cases. On the other hand, more layer formation number of both of the layers results in more improved mixing of the hardenable resin components and the hardener components. However, practically, both of the layers are each preferably formed in 3 to 10 layers, and more preferably in 4 to 5 layers, because the amount of the hardenable resins and the hardeners consumed in forming the separation layers increases.

In the present invention, the aggregate component layer may be further formed on the uppermost layer of the hardenable resin component layers and the hardener component layers formed so as to give the desired layer number in the crushable capsule to fill a space in the capsule and to cut off heat given in melt sealing of the glass capsule filled with the respective components from the hardenable resin component and/or the hardener component.

In the anchor-fixing capsule of the present invention, the crushable capsule is filled with both of the components so as to give the desired layer number by a method of supplying the hardenable resin component and the hardener component alternately from supply nozzles for both of the components, or by a method of intermittently moving the crushable capsule with a rotating or linearly advancing conveyer and supplying both of the components at predetermined positions. The aggregate component may be supplied at the final stage. Then, an upper opening of the capsule is sealed by heat-melting. Thus, the anchor-fixing capsule can be produced.

Thereafter, the separation layers are formed between the respective layers by standing. It is unfavorable to give a great vibration or impact to the capsule until the separation layers are formed. However, such a vibration that it is caused by conveyance for filling the capsule with the respective components or movement in the process scarcely disturbs formation of the separation layers, and has little adverse effect on the product.

In the anchor-fixing capsules of the present invention, the hardenable resin components and the hardener components are dispersedly disposed in the capsules. Compared with conventional products, therefore, not only high adhesive strength is obtained, but also a variation in adhesive strength is small. Further, when drilled holes are filled with water, a reduction in adhesive strength is also very small.

The present invention provides the anchor-fixing capsules giving high adhesive strength in post installation, and the significance thereof in the industrial fields, particularly in the civil engineering and building fields, is extremely great.

The present invention will be illustrated with reference to an example and a comparative example in more detail below.

(1) PRODUCTION OF CAPSULE

EXAMPLE 1

A glass container with a bottom having a diameter of 13 mm and a height of 130 mm was filled with a hardenable resin component and a hardener component alternately, and thereafter, an aggregate component was disposed as an uppermost layer. Then, an opening of the glass container was melt sealed to produce an anchor-fixing capsule of the present invention having a height of 100 mm after sealing as shown in FIG. 1 in which hardenable resin component layers and hardener component layers separated by separation layers are each formed in four layers.

Referring to FIG. 1, reference numeral 1 designates the hardenable resin component layers, reference numeral 2 designates the hardener component layers, reference numeral 3 designates the separation layers, reference numeral 4 designates the glass container, reference numeral 5 designates the aggregate component, and reference numeral 6 designates an arrow showing the driving direction of an anchor. The same also applies to FIG. 2.

The respective components used are shown below.
Hardenable Resin Component
Unsaturated polyester resin of the bisphenol family (viscosity: 5,700 centipoises)
Hardener Component
Hardener: Benzoyl peroxide (concentration: 50% by weight, diluted with dicyclohexyl phthalate, granules)
Aggregate: Glass beads (mean particle size: 0.2 mm)
Hardener/Aggregate=3/2 (mixing weight ratio)
Aggregate of the Uppermost Layer
Glass beads (mean particle size: 0.2 mm)
The fill amount of each component was determined so as to give a weight ratio of the hardenable resin component to the hardener component of 2:1.

COMPARATIVE EXAMPLE 1

Figure 2:
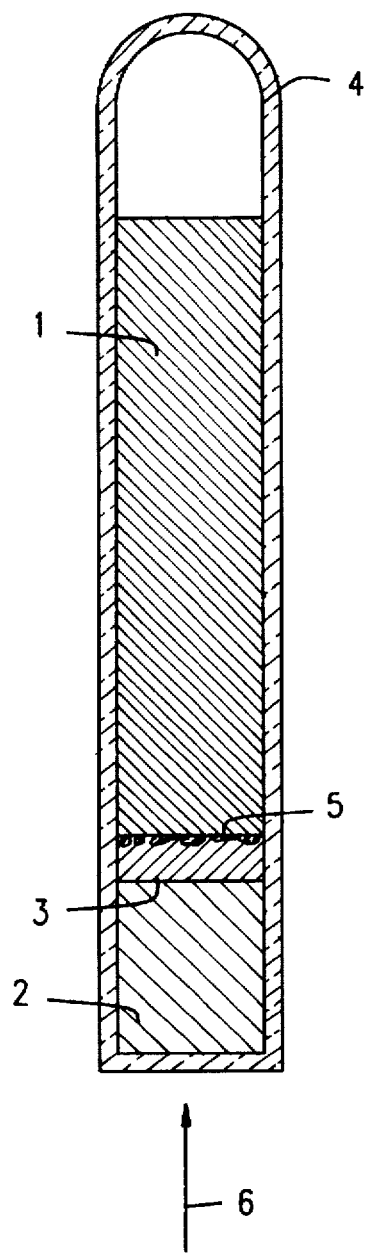
FIG. 2 is a cross sectional view showing an anchor-fixing capsule produced by the prior art in Comparative Example 1.

A glass container with a bottom having the same size as that of the container used in Example 1 was first filled with a hardener component, and then, with an unsaturated polyester resin. Thereafter, an opening of the glass container was melt sealed in the same manner as with Example 1, followed by standing to produce an anchor-fixing capsule for comparison in which a hardenable resin component layer and a hardener component layer separated by a separation layer are disposed, as shown in FIG. 2.

As the respective components, the same kinds of unsaturated polyester resin and hardener component (a mixture of benzoyl peroxide and calcium sulfate) as used in anchor-fixing capsules were used. However, the hardenable resin/hardener ratio was the same as with Example 1.

(2) EVALUATION TEST

TEST EXAMPLE 1 AND COMPARATIVE TEST EXAMPLE 1

A hole having a diameter of 15 mm and a depth of 110 mm was bored into a concrete block having a compressive strength of 210 kgf/cm$^2$ and dimensions of 1,000 mm×1,000 mm×600 mm, and cleaned with a blower, a brush and the blower in this order. Each of the anchor-fixing capsule of the present invention produced in Example 1 and the anchor-fixing capsule for comparison produced in Comparative Example 1 was inserted into the hole in the direction indicated by the arrow in FIGS. 1 and 2. Then, a high strength bolt having a nominal diameter of 12 mm and a length of 160 mm was driven to a hole bottom with a hammer of 1.5 kg, and subjected to the tensile test after 24 hours.

For each capsule, three bolts were installed and tensile tested, and results of three measurements and the mean value thereof are shown in Table 1.

TABLE 1

| | Tensile Strength (ton) | |
|---|---|---|
| Sample No. | Test Example 1 | Comparative Test Example 1 |
| No. 1 | 4.23 | 2.23 |
| No. 2 | 4.64 | 3.10 |
| No. 3 | 4.37 | 2.51 |
| Mean Value | 4.41 | 2.51 |

TEST EXAMPLE 2 AND COMPARATIVE TEST EXAMPLE 2

A hole having the same dimensions as with Test Example 1 was bored into a concrete block having the same strength and dimensions as with Test Example 1, and cleaned in the same manner as with Test Example 1. Then, the hole was filled with water, and installation was performed under the same conditions as with Test Example 1.

Results of the tensile tests conducted after 24 hours are shown in Table 2.

TABLE 2

| | Tensile Strength (ton) | |
|---|---|---|
| Sample No. | Test Example 2 | Comparative Test Example 2 |
| No. 1 | 3.36 | 0.96 |
| No. 2 | 3.10 | 0.80 |
| No. 3 | 3.82 | 0.75 |
| Mean Value | 3.43 | 0.84 |

What is claimed is:

1. An anchor-fixing capsule comprising a crushable capsule, liquid a hardenable resin component and a powdery or granular hardener component with which the crushable capsule is filled, said hardenable resin component being separated from said hardener component by a separation layer, wherein said hardenable resin component and said hardener component are each alternately disposed in at least two layers.

2. The anchor-fixing capsule as claimed in claim 1, which further comprises an aggregate component layer as an uppermost layer in the crushable capsule.

3. The anchor-fixing capsule as claimed in claim 1, wherein said hardenable resin component is comprised of a hardenable resin having a gelation time of 30 seconds to 10 minutes at 25° C.

4. The anchor-fixing capsule as claimed in claim 1, wherein said hardenable resin component has a viscosity of 300 to 50,000 centipoises.

5. The anchor-fixing capsule as claimed in claim 1, wherein said hardener component is comprised of a peroxide and a diluent, and optionally an aggregate.

6. The anchor-fixing capsule as claimed in claim 1, wherein said separation layer is a resin layer hardened by the reaction of the hardenable resin with the hardener.

7. The anchor-fixing capsule as claimed in claim 1, wherein said crushable capsule is a cylindrical glass container, and an upper portion thereof is sealed by heat-melting.

* * * * *